United States Patent
Adams et al.

(10) Patent No.: US 9,854,724 B2
(45) Date of Patent: Jan. 2, 2018

(54) AGRICULTURAL IMPLEMENT WITH COMBINED DOWN FORCE AND DEPTH CONTROL

(71) Applicant: CNH Industrial America LLC, New Holland, PA (US)

(72) Inventors: Brian T. Adams, Centralia, MO (US); Keith W. Wendte, Willowbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/976,787

(22) Filed: Dec. 21, 2015

(65) Prior Publication Data
US 2016/0106022 A1    Apr. 21, 2016

Related U.S. Application Data

(62) Division of application No. 13/967,873, filed on Aug. 15, 2013, now Pat. No. 9,215,837, which is a division
(Continued)

(51) Int. Cl.
| | |
|---|---|
| *A01B 5/04* | (2006.01) |
| *A01B 33/08* | (2006.01) |
| *A01B 49/06* | (2006.01) |
| *A01B 61/04* | (2006.01) |
| *A01B 63/111* | (2006.01) |

(Continued)

(52) U.S. Cl.
CPC .............. *A01B 63/008* (2013.01); *A01B 5/04* (2013.01); *A01B 33/087* (2013.01); *A01B 49/06* (2013.01);
(Continued)

(58) Field of Classification Search
CPC ........... A01B 5/04; A01B 5/00; A01B 33/087; A01B 33/08; A01B 33/00; A01B 49/06; A01B 49/04; A01B 49/00; A01B 61/046; A01B 61/044; A01B 61/04; A01B 61/00; A01B 61/048; A01B 63/111; A01B 63/10; A01B 63/02; A01B 63/00; A01B 63/114; A01B 63/008; A01B 63/002; A01C 5/064; A01C 5/062; A01C 5/06; A01C 5/00; A01C 5/066; A01C 5/068; A01C 7/203; A01C 7/201; A01C 7/20; A01C 7/00; A01C 7/205
USPC ....... 172/4, 2; 701/50; 111/136, 137, 69, 81, 111/140, 143, 151, 163, 167, 193, 194, 111/200, 900, 903, 52, 59–66, 134, 135,
(Continued)

(56) References Cited

U.S. PATENT DOCUMENTS

| | | |
|---|---|---|
| 4,176,721 A | 12/1979 | Poggemiller et al. |
| 4,210,260 A | 7/1980 | Luttrell |

(Continued)

*Primary Examiner* — Christopher J. Novosad
(74) *Attorney, Agent, or Firm* — Rebecca L. Henkel; Rickard K. DeMille

(57) ABSTRACT

An agricultural implement system includes a down force cylinder configured to apply a downward force to a row unit, and a depth control cylinder configured to vary a penetration depth of a ground engaging tool of the row unit. The agricultural implement system also includes a valve assembly in fluid communication with the down force cylinder and the depth control cylinder. The valve assembly is configured to automatically adjust the downward force by varying fluid pressure within the down force cylinder based on fluid pressure within the depth control cylinder.

20 Claims, 5 Drawing Sheets

Related U.S. Application Data of application No. 12/870,949, filed on Aug. 30, 2010, now Pat. No. 8,522,889.

(51) Int. Cl.
*A01B 63/114* (2006.01)
*A01C 5/06* (2006.01)
*A01C 7/20* (2006.01)
*A01B 63/00* (2006.01)

(52) U.S. Cl.
CPC .......... *A01B 61/046* (2013.01); *A01B 61/048* (2013.01); *A01B 63/111* (2013.01); *A01B 63/114* (2013.01); *A01C 5/064* (2013.01); *A01C 5/066* (2013.01); *A01C 5/068* (2013.01); *A01C 7/203* (2013.01); *A01C 7/205* (2013.01)

(58) Field of Classification Search
USPC ..... 111/70, 71, 79, 139, 149, 157, 164–166, 111/168, 190–192, 195
See application file for complete search history.

(56) References Cited

U.S. PATENT DOCUMENTS

| | | |
|---|---|---|
| 4,413,685 A | 11/1983 | Gremelspacher et al. |
| 4,423,788 A | 1/1984 | Robinson, Jr. et al. |
| 5,170,730 A | 12/1992 | Swallow |
| 5,260,875 A | 11/1993 | Tofte et al. |
| 5,323,721 A | 6/1994 | Tofte et al. |
| 5,524,560 A | 6/1996 | Carter |
| 5,816,328 A | 10/1998 | Manson et al. |
| 6,070,539 A | 6/2000 | Flamme et al. |
| 6,079,340 A | 6/2000 | Flamme et al. |
| 6,216,794 B1 | 4/2001 | Buchl |
| 6,389,999 B1 | 5/2002 | Duello |
| 6,460,623 B1 | 10/2002 | Knussman et al. |
| 6,688,245 B2 | 2/2004 | Juptner |
| 6,701,857 B1 | 3/2004 | Jensen et al. |
| 6,761,120 B2 | 7/2004 | Kovach et al. |
| 6,827,029 B1 | 12/2004 | Wendte |
| 7,191,715 B2 | 3/2007 | Wendte et al. |
| 7,308,859 B2 | 12/2007 | Wendte et al. |
| 7,395,769 B2 | 7/2008 | Jensen |
| 7,401,561 B1 | 7/2008 | Kurz |
| 7,481,278 B1 | 1/2009 | Pomedli et al. |
| 8,448,717 B2 | 5/2013 | Adams et al. |
| 8,522,889 B2 | 9/2013 | Adams et al. |
| 9,215,837 B2 * | 12/2015 | Adams .................. A01C 7/203 |
| 9,307,688 B2 * | 4/2016 | Adams .................. A01C 7/203 |
| 2006/0213407 A1 | 9/2006 | Sauder et al. |
| 2008/0047475 A1 | 2/2008 | Stehling et al. |
| 2013/0248214 A1 | 9/2013 | Adams et al. |
| 2013/0319698 A1 | 12/2013 | Adams et al. |
| 2013/0325267 A1 | 12/2013 | Adams et al. |

* cited by examiner

AGRICULTURAL IMPLEMENT WITH COMBINED DOWN FORCE AND DEPTH CONTROL

CROSS REFERENCE TO RELATED APPLICATIONS

This application is a divisional of U.S. patent application Ser. No. 13/967,873, entitled "AGRICULTURAL IMPLEMENT WITH COMBINED DOWN FORCE AND DEPTH CONTROL", filed Aug. 15, 2013, which is a divisional of U.S. patent application Ser. No. 12/870,949, entitled "AGRICULTURAL IMPLEMENT WITH COMBINED DOWN FORCE AND DEPTH CONTROL", filed Aug. 30, 2010. Each of the foregoing applications is herein incorporated by reference in its entirety.

BACKGROUND

The invention relates generally to ground working equipment, such as agricultural equipment, and more specifically, to an implement incorporating a combined down force and depth control system to maintain a substantially uniform seed deposition depth.

Generally, seeding implements are towed behind a tractor or other work vehicle. For example, a tongue of the implement may be connected to a drawbar of the tractor, or a mast of the implement may be connected to a 3-point hitch of the tractor. These seeding implements typically include a ground engaging tool or opener that forms a seeding path for seed deposition into the soil. In certain configurations, a gauge wheel is positioned a vertical distance above the opener to establish a desired trench depth for seed deposition into the soil. As the implement travels across a field, the opener excavates a trench into the soil, and seeds are deposited into the trench. As will be appreciated, maintaining a constant trench depth provides a substantially uniform soil cover which enhances crop yields.

Certain implements include a gauge wheel rigidly mounted to the implement at a desired vertical distance above the opener. In such implements, a significant down force may be applied to the gauge wheel to ensure that the opener remains at the desired penetration depth despite variations in the terrain. Unfortunately, providing such a down force to the gauge wheel may compact the soil adjacent to the seed trench, thereby impeding crop growth. In addition, because the gauge wheel is pressed firmly against the soil surface, contact between the gauge wheel or the opener and any obstructions (e.g., rocks, clods, etc.) may induce an acceleration that propagates through the implement, thereby potentially reducing the operational life of certain components within the implement.

BRIEF DESCRIPTION

The present invention provides an implement including a valve assembly configured to maintain a contact force between a gauge wheel and the soil by controlling a down force applied to a row unit. In an exemplary embodiment, the agricultural implement includes a down force cylinder configured to apply a downward force to the row unit. The agricultural implement also includes a depth control cylinder configured to vary a penetration depth of a ground engaging tool of the row unit. Furthermore, the agricultural implement includes a valve assembly in fluid communication with the down force cylinder and the depth control cylinder. The valve assembly is configured to automatically adjust the downward force by varying fluid pressure within the down force cylinder based on fluid pressure within the depth control cylinder. In this manner, the contact force between the gauge wheel and the soil surface may be maintained despite variations in the terrain.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
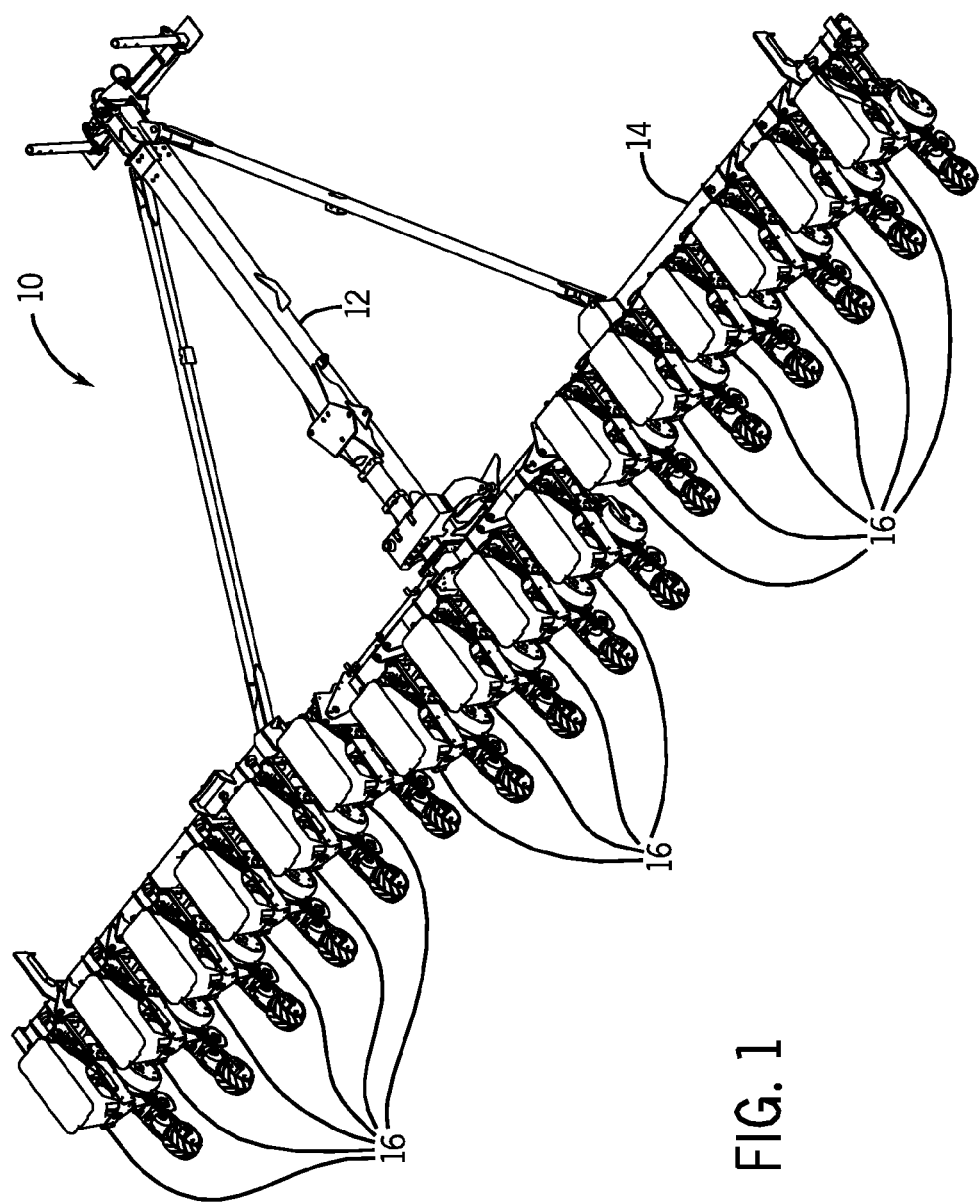
FIG. 1 is a perspective view of an exemplary agricultural implement.

Turning now to the drawings, FIG. 1 is a perspective view of an agricultural implement 10. The implement 10 is designed to be towed behind a work vehicle such as a tractor. The implement 10 includes a tongue assembly 12 which is shown in the form of an A-frame hitch assembly. The tongue assembly 12 may include a hitch used to attach to an appropriate tractor hitch via a ball, clevis, or other coupling. For example, a tongue of the implement may be connected to a drawbar of the tractor, or a mast of the implement may be connected to a 3-point hitch of the tractor. The tongue assembly 12 is coupled to a tool bar 14 which supports multiple seeding implements or row units 16. As discussed in detail below, the agricultural implement 10 includes a pneumatic system configured to automatically adjust a down force on each row unit 16 based on fluid pressure within a depth control cylinder. For example, in certain embodiments, each row unit 16 includes an opener disk rotatably coupled to a chassis of the row unit 16 and configured to engage soil. The row unit 16 also includes a gauge wheel assembly movably coupled to the chassis and including a gauge wheel configured to rotate across a soil surface to limit a penetration depth of the opener disk into the soil. In addition, the row unit 16 includes a depth control cylinder extending between the chassis and the gauge wheel assembly. The depth control cylinder is configured to adjust the penetration depth of the opener disk by varying position of the gauge wheel relative to the chassis. A down force cylinder extending between the tool bar and the chassis is configured to vary a contact force between the gauge wheel and the soil surface. To adjust the contact force, a down force control valve is provided to regulate a flow of fluid to the down force cylinder. The row unit 16 also includes an actuator coupled to the down force control valve and in fluid communication with the depth control cylinder. The actuator is configured to automatically adjust the contact force by varying the flow of fluid through the down force control valve based on fluid pressure within the depth control cylinder. In this manner, the contact force between the gauge wheel and the soil surface may be maintained despite variations in the terrain.

Figure 2:
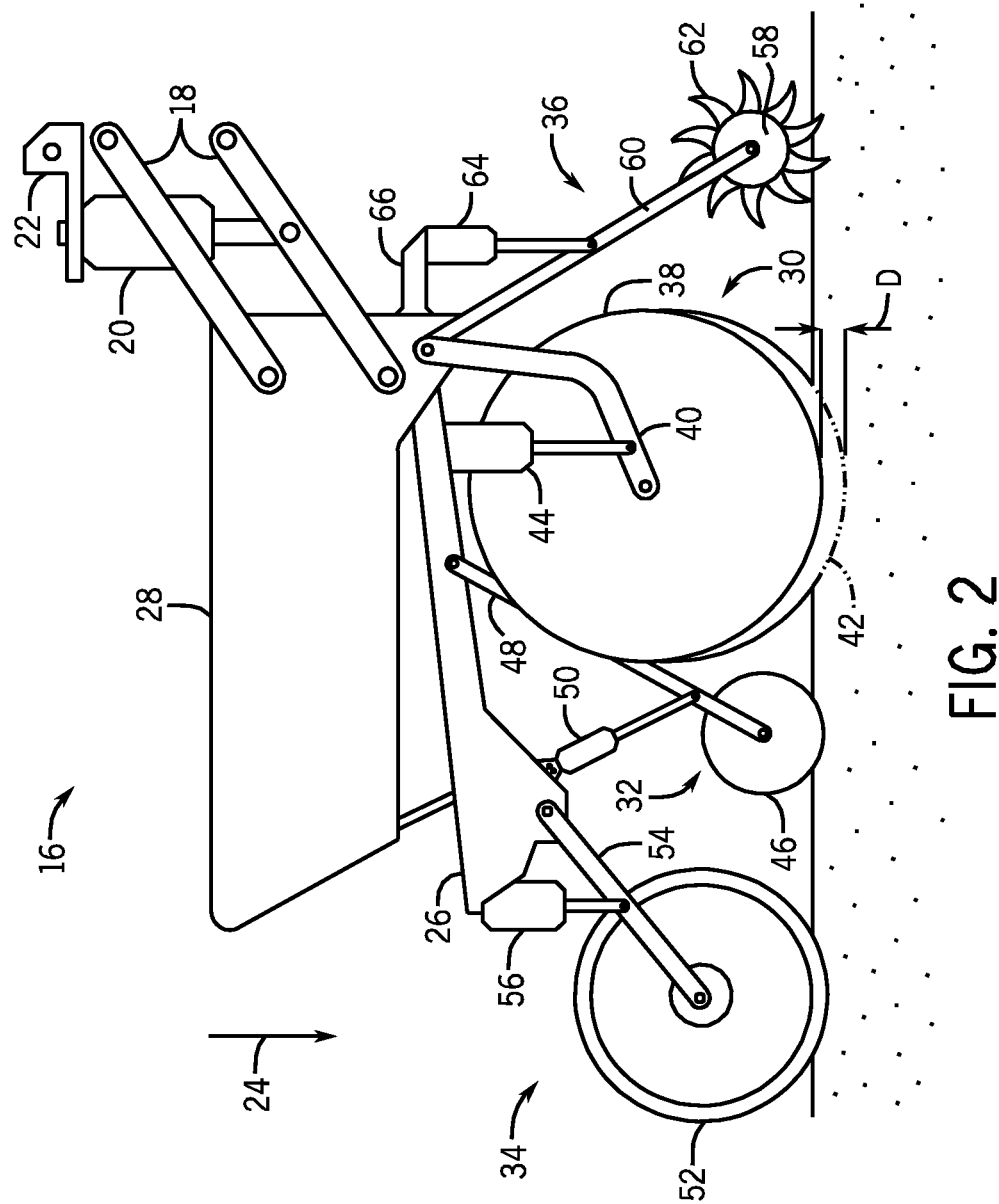
FIG. 2 is a side view of an exemplary row unit that may be employed within the agricultural implement shown in FIG. 1.

FIG. 2 is a side view of an exemplary row unit 16 that may be employed within the agricultural implement 10 shown in FIG. 1. As illustrated, the row unit 16 includes elements 18 of a parallel linkage assembly, also known as a four bar linkage, configured to couple the row unit 16 to the tool bar 14, while enabling vertical movement of the row unit 16. In addition, a down force cylinder 20 extends between a mounting bracket 22 and a lower portion of the parallel linkage to establish a contact force between the row unit 16 and the soil. The down force cylinder 20 is configured to apply a force to the row unit 16 in a downward direction 24, thereby driving a ground engaging tool into the soil. As will be appreciated, a desired level of down force may vary based on soil type, the degree of tillage applied to the soil, soil moisture content, amount of residue cover, and/or tool wear, among other factors. Because such factors may vary from one side of the implement 10 to the other, a different level of down force may be selected for each row unit 16.

Furthermore, a desired level of down force may be dependent on the speed at which the row unit 16 is pulled across the field. For example, as speed increases, the ground engaging tools may have a tendency to rise out of the ground due to the interaction between the soil and the tool. Consequently, a greater down force may be applied during higher speed operation to ensure that the ground engaging tools remain at a desired depth. In addition, the weight of the row unit 16 applies a force to the ground engaging tools in the downward direction 24. However, as seeds and/or other products are transferred from a storage container within the row unit 16 to the soil, the weight of the row unit 16 decreases. Therefore, the down force cylinder 20 may apply a greater force to the row unit 16 to compensate. In certain embodiments, the down force cylinder 20 may be coupled to a control system configured to automatically regulate the pressure within the down force cylinder 20 to maintain a desired contact force between the ground engaging tools and the soil. Because each row unit 16 includes an independent down force cylinder 20, the contact force may vary across the implement 10, thereby establishing a substantially uniform seed deposition depth throughout the field.

In the present embodiment, the parallel linkage elements 18 are pivotally coupled to a chassis 26 and a frame 28. The frame 28 may be configured to support various elements of the row unit 16 such as a metering system and a product storage container, for example. As illustrated, the chassis 26 supports an opener assembly 30, a soil closing assembly 32, a press assembly 34, and a residue manager assembly 36. In the present configuration, the opener assembly 30 includes a gauge wheel assembly having a gauge wheel 38 and a rotatable arm 40 which functions to movably couple the gauge wheel 38 to the chassis 26. The gauge wheel 38 may be positioned a vertical distance D above an opener disk 42 to establish a desired trench depth for seed deposition into the soil. As the row unit 16 travels across a field, the opener disk 42 excavates a trench into the soil, and seeds are deposited into the trench. The opener assembly 30 also includes a depth control cylinder 44 extending between the chassis 26 and the rotatable arm 40 of the gauge wheel assembly. The depth control cylinder 44 is configured to adjust the penetration depth D of the opener disk 42 by varying a position of the gauge wheel 38 relative to the chassis 26. While one opener assembly 30 is illustrated in the present embodiment, it should be appreciated that alternative embodiments may include a pair of opener assemblies 30 positioned on opposite sides of the chassis 26. In such configurations, the opener disks 42 may be angled toward one another to establish a wider trench within the soil.

As will be appreciated, seeds may be deposited within the excavated trench via a seed tube extending between a metering system within the frame 28 and the soil. The seed tube exit may be positioned aft of the opener assembly 30 and forward of the closing assembly 32 such that seeds flow into the trench. Closing disks 46 of the closing assembly 30 push the excavated soil into the trench, thereby closing the trench. As illustrated, the closing assembly 32 includes an arm 48 extending between the chassis 26 and the closing disk 46. A closing disk cylinder 50 is coupled to the arm 48 of the closing assembly 32, and configured to regulate a contact force between the closing disk 46 and the soil. For example, a large contact force may be applied to effectively push dense soil into the trench, while a relatively small contact force may be applied to close a trench within loose soil. While one closing disk 46 is shown in the present embodiment, it should be appreciated that alternative embodiments may include a pair of disks 46. In addition, certain embodiments may employ closing wheels instead of the illustrated closing disk 46.

As illustrated, a press wheel 52 of the press wheel assembly 34 is positioned aft of the closing assembly 32, and serves to pack soil on top of the deposited seeds. In the present embodiment, the press wheel assembly 34 includes an arm 54 extending between the chassis 26 and the press wheel 52. A press wheel cylinder 56 is coupled to the arm 54 of the press wheel assembly 34, and configured to regulate a contact force between the press wheel 52 and the soil. For example, in dry conditions, it may be desirable to firmly pack soil directly over the seeds to seal in moisture. In damp conditions, it may be desirable to leave the soil over the seeds fairly loose in order to avoid compaction which may result in seed crusting. The process of excavating a trench into the soil, depositing seeds within the trench, closing the trench and packing soil on top of the seeds establishes a row of planted seeds within a field. By employing multiple row units 16 distributed along the tool bar 14, as shown in FIG. 1, multiple rows of seeds may be planted within the field.

Certain embodiments of the row unit 16 may employ a residue manager assembly 36 to prepare the ground before seed deposition. As illustrated, the residue manager assembly 36 includes a wheel 58 coupled to the chassis 26 by an arm 60. The wheel 58 includes tillage points or fingers 62 configured to break up crop residue on the soil surface. A residue manager cylinder 64 extends from a bracket 66 to the arm 60 of the residue manager assembly 36, and configured to regulate a contact force between the wheel 58 and the soil. While a single residue manager wheel 58 is shown in the present embodiment, it should be appreciated that alternative embodiments may include a pair of wheels 58 angled toward one another. In the present embodiment, the residue manager 36 may serve as a shock absorber to dissipate row unit bounce caused by contact with rocks or piles of residue, thereby protecting mechanical components of the row unit 16.

Figure 3:
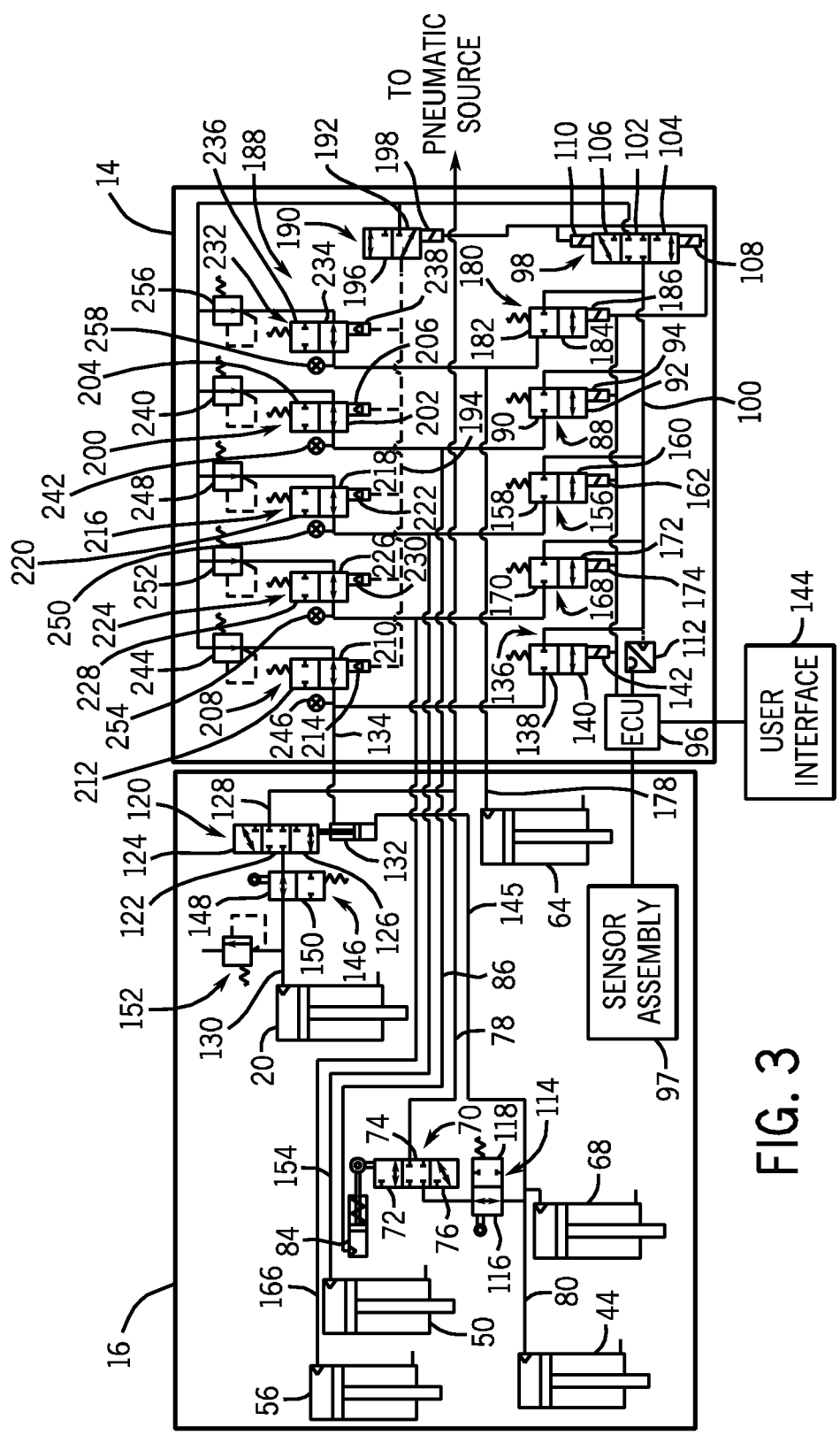
FIG. 3 is a schematic diagram of an exemplary pneumatic system configured to automatically adjust a down force on the row unit based on pneumatic pressure within a depth control cylinder.

FIG. 3 is a schematic diagram of an exemplary pneumatic system configured to automatically adjust the down force on the row unit based on the pneumatic pressure within the depth control cylinder. As illustrated, the present configuration employs a pair of depth control cylinders. For example, the first depth control cylinder 44 may be utilized to adjust the position of the right gauge wheel 38 with respect to the chassis 26, while a second depth control cylinder 68 adjusts the position of a left gauge wheel. Such an embodiment may employ a corresponding pair of opener disks positioned adjacent to each gauge wheel. In this configuration, the opener disks may be angled toward one another to establish a wider trench within the soil. While a pair of depth control cylinders 44 and 68 are employed in the present configuration to adjust the penetration depth of a pair of opener disks, it should be appreciated that alternative configurations may employ a single opener assembly with a single depth control cylinder.

In the present configuration, both of the depth control cylinders 44 and 68 are in fluid communication with a depth control valve 70 configured to regulate a pneumatic pressure within the depth control cylinders 44 and 68. As illustrated, the depth control valve 70 is a three position/four way rotary leveling valve. The first position 72 is configured to facilitate a flow of air out of the depth control cylinders 44 and 68, thereby raising the gauge wheels relative to the chassis 26. The second position 74 is configured to block the flow of air into and out of the cylinders 44 and 68 to hold the gauge wheels at a desired position. The third position 76 is configured to facilitate a flow of air from a pneumatic source to the cylinders 44 and 68. Specifically, a pneumatic supply conduit 78 couples the depth control valve 70 to the pneumatic source (e.g., pump, compressor, etc.). In the third position 76, the valve 70 enables air to flow from the pneumatic supply conduit 78 to a pneumatic conduit 80 coupling the depth control valve 70 to the depth control cylinders 44 and 68. In the illustrated embodiment, the depth control cylinders 44 and 68 are double acting pneumatic cylinders. As illustrated, the pneumatic conduit 80 is in fluid communication with the cap end of each cylinder 44 and 68, and the rod end of each cylinder 44 and 68 is in fluid communication with the atmosphere. Consequently, each cylinder 44 and 68 will operate as a single acting cylinder. In this configuration, when the valve 70 is in the third position 76, air flow from the pneumatic source pressurizes the cap end of the cylinders 44 and 68, thereby inducing the piston rod to extend. Conversely, when the valve 70 is in the first position 72, air within the cap end of the cylinders 44 and 68 is allowed to exhaust, thereby facilitating retraction of the piston rod. In alternative embodiments, the orientation of the cylinders 44 and 68 may be reversed, with the pneumatic conduit 80 coupled to the rod end of the cylinders.

As will be appreciated, because air is a compressible fluid, the depth control cylinders 44 and 68 provide a suspension system for the row unit 16. For example, as the row unit 16 is pulled across the field, the gauge wheels may move vertically in response to contact with obstructions in the soil. As the gauge wheels move, the air within the cylinders 44 and 68 is temporarily compressed, thereby partially dissipating the force of impact. As will be appreciated, such a configuration may substantially reduce the wear associated with row unit vibrations, thereby extending the operation life of row unit components.

In the present configuration, the pneumatic conduit 80 extends between the first depth control cylinder 44 and the second depth control cylinder 68. In this configuration, both of the depth control cylinders 44 and 68 are controlled by a single depth control valve 70. In addition, the pneumatic conduit 80 serves to reduce the magnitude of gauge wheel movement in response to contact with an obstacle in the soil. For example, if the right gauge wheel 38 contacts an obstacle, air within the cap end of the first depth control cylinder 44 will be compressed, thereby causing the right gauge wheel 38 to move vertically upwards. In addition, because the first depth control cylinder 44 is in fluid communication with the second depth control cylinder 68 via the pneumatic conduit 80, air from the first depth control cylinder 44 will be transferred to the cap end of the second depth control cylinder 68. Consequently, the piston rod of the second depth control cylinder 68 will move vertically downward in response to the increased air pressure. As a result, the average depth of the opener disks within the soil may be maintained. Similarly, if the right gauge wheel 38 encounters a depression within the soil, the left gauge wheel may move vertically upwards due to the pneumatic connection between the cylinders. Therefore, the pneumatic conduit 80 serves to equalize variations in soil depth encountered by each gauge wheel 38.

As illustrated, the position of the depth control valve 70 is regulated by a depth control actuator 84. In the present configuration, the depth control actuator 84 is a single acting pneumatic cylinder. A pneumatic supply conduit 86 is coupled to the cap end of the cylinder, and a spring (or other biasing device) urges the piston toward the cap end. Consequently, the depth control valve 70 may be actuated by increasing or decreasing pressure to the cap end of the depth control actuator 84. For example, in the present configuration, increasing pressure to the actuator 84 drives the depth control valve 70 toward the third position 76, thereby providing air pressure to the depth control cylinders 44 and 68 and decreasing the depth of the opener disk 42. Conversely, decreasing pressure to the actuator 84 enables the spring to drive the piston toward the cap end, thereby driving the depth control valve 70 to the first position 72 which releases air from the depth control cylinders 44 and 68 and increases the depth of the opener disk 42.

In the present configuration, the pressure within the pneumatic supply conduit 86 is controlled by a selection control valve 88. As illustrated, the selection control valve 88 is a two position/two way pneumatic valve. The first position 90 is configured to block air flow through the valve, while the second position 92 facilitates air flow to the depth control actuator 84. An electronic actuator 94 (e.g., solenoid) regulates the position of the selection control valve 88. The electronic actuator 94 is communicatively coupled to an electronic control unit (ECU) 96 which is configured to vary the position of the selection control valve 88 to achieve a desired pressure within the actuator 84. In certain embodiments, the ECU 96 is configured to measure the penetration depth of the opener disks, and to vary pressure within the depth control cylinders 44 and 68 to compensate for a difference between a desired penetration depth and the measured penetration depth.

As illustrated, the row unit 16 includes a sensor assembly 97 communicatively coupled to the ECU 96. In certain embodiments, the sensor assembly 97 may be configured to directly measure the penetration depth of the opener disks. For example, the sensor assembly 97 may include an optical measurement system or a radio frequency transducer configured to measure the distance between the opener disks and the soil surface. Alternatively, the sensor assembly 97 may include a linear or rotary potentiometer configured to measure the position of the gauge wheels relative to the chassis 26. Because the penetration depth corresponds to the difference in height between the gauge wheels and the opener disks, measuring the gauge wheel position will facilitate calculation of the penetration depth. In certain embodiments, the ECU 96 may regulate pressure within the depth control cylinders 44 and 68 until a desired penetration depth is achieved.

The selection control valve 88 is fluidly coupled to an inflate/exhaust valve 98 via a pneumatic supply conduit 100. In the present embodiment, the inflate/exhaust valve 98 is a three position/four way valve (e.g., poppet valve, spool valve, etc.). The first position 102 is configured to block air flow between the pneumatic supply conduit 100 and the pneumatic source, the second position 104 is configured to facilitate air flow out of the pneumatic supply conduit 100, and the third position 106 is configured to fluidly couple the pneumatic source to the pneumatic supply conduit 100. The inflate/exhaust valve 98 also includes two actuators 108 and 110 configured to adjust the position of the valve 98. In the present embodiment, the first actuator 108 is a solenoid configured to drive the inflate exhaust valve 98 to the second position 104, and the second actuator 110 is a solenoid configured to drive the valve 98 to the third position 106. By adjusting the position of the inflate/exhaust valve 98, the ECU 96 may selectively provide air to the pneumatic supply conduit 100, maintain air pressure within the pneumatic supply conduit 100, or release air from the pneumatic supply conduit 100. As illustrated, a pressure sensor 112 is coupled to the pneumatic supply conduit 100, and configured to output a signal to the ECU 96 indicative of the pressure within the conduit 100. In this configuration, the ECU 96 may provide a desired pressure to the selection control valve 88 by adjusting the position of the inflate/exhaust valve 98 via the actuators 108 and 110.

In the present embodiment, a depth adjustment system, including the ECU 96 and the sensor assembly 97, is configured to maintain a desired penetration depth by increasing or decreasing pressure within the actuator 84. For example, if the planting depth is deeper than desired, the ECU 96 will activate the solenoid 94, thereby driving the selection control valve 88 to the second position 92. The ECU 96 will then activate the solenoid 110, thereby driving the inflate/exhaust valve 98 to the second position 106. In the second position 106, air from the pneumatic source will flow into the pneumatic supply conduit 100. With the selection control valve 88 in the second position 92, air from the pneumatic supply conduit 100 will flow through the valve 88 and the pneumatic conduit 86 to the actuator 84 until a desired pressure within the actuator 84 is achieved, as measured by the pressure sensor 112. Next, the ECU 96 will instruct the electronic actuator 94 to transition the valve 88 to the first position 90, thereby blocking air flow between the supply conduit 100 and the actuator 84. Consequently, pressure within the cap end of the actuator 84 will be maintained at the desired pressure. As previously discussed, increasing air pressure to the cap end of the actuator 84 drives the depth control valve 70 toward the third position 76, thereby providing the depth control cylinders 44 and 68 with air from the supply conduit 78. As a result, the gauge wheels will be driven downwardly until a desired position is achieved.

Once the sensor assembly 97 determines that a desired penetration depth has been reached, the ECU 96 will terminate air flow to the depth control cylinders 44 and 68. Specifically, the ECU 96 will transition the selection control valve 88 to the second position 92, which establishes fluid communication between the conduits 86 and 100. The ECU 96 will then transition the inflate/exhaust valve 98 to the second position 104, which facilitates air flow out of the pneumatic supply conduit 100. Consequently, pressure within the cap end of the depth control actuator 84 will decrease as air exhausts from the actuator 84. As previously discussed, the decrease in air pressure will drive the piston rod of the actuator 84 toward the cap end, thereby inducing the depth control valve 70 to transition to the second position 74 which blocks air flow to the depth control cylinders 44 and 68. Once the ECU 96 receives a signal from the pressure sensor 112 that the pressure within the cap end of the actuator 84 corresponds to a pressure indicative of the depth control valve 70 being in the second position 74, the ECU 96 will transition the selection control valve 88 to the first position 90 which blocks flow to the pneumatic supply conduit 86. Consequently, pressure within the actuator 84 will be maintained, thereby blocking air flow to the depth control cylinders 44 and 68. It should be appreciated that transitioning the selection control valve 88 to the second position 92 and transitioning the inflate/exhaust valve 98 to the first position 102 enables the pressure sensor 112 to measure the pressure within the cap end of the actuator 84.

In an alternative embodiment, the depth control valve 70 may be coupled to the gauge wheel arms 40 by a linkage such that movement of the gauge wheels 38 automatically adjusts pressure to the depth control cylinders 44 and 68, thereby maintaining a desired penetration depth of the opener disks 42. For example, if the planting depth is deeper than desired, the raised position of the gauge wheels 38 will drive the depth control valve 70 to the third position 76, thereby providing the depth control cylinders 44 and 68 with air from the supply conduit 78. As a result, the gauge wheels 38 will be driven downwardly until a desired position is achieved. As the gauge wheels 38 approach the desired position, the linkage will drive the depth control valve 70 to the second position 74 which blocks air flow to the depth control cylinders 44 and 68, thereby establishing the desired planting depth. Conversely, if the planting depth is shallower than desired, the lowered position of the gauge wheels 38 will drive the depth control valve 70 to the first position 72, thereby releasing air from the depth control cylinders 44 and 68. As a result, the gauge wheels 38 will be driven upwardly until a desired position is achieved. As the gauge wheels 38 approach the desired position, the linkage will drive the depth control valve 70 to the second position 74 which blocks air flow from the depth control cylinders 44 and 68, thereby establishing the desired planting depth. As will be appreciated, certain row units 16 include a single gauge wheel 38, gauge wheel arm 40 and depth control cylinder 44. In such embodiments, the depth control valve 70 will be coupled to the gauge wheel arm 40 by the linkage. However, if the row unit 16 employs two gauge wheels 38, two gauge wheel arms 40 and two depth control cylinders 44 and 68, the linkage may be configured to mechanically average the position of the gauge wheels 38 such that depth control valve position is adjusted based on the average planting depth.

The illustrated row unit 16 also includes a blocking valve 114 configured to maintain pressure within the depth control cylinders 44 and 68 while the implement 10 is in a non-working position. For example, in certain configurations, the tool bar 14 may be raised above the ground at a headland of a field such that the row units 16 disengage the soil. In this non-working position, the implement 10 may be rotated at the headland and aligned with the next series of rows without the row units 16 excavating trenches or depositing seeds within the headland. Maintaining air pressure within the depth control cylinders 44 and 68 while the implement 10 is in the non-working position ensures that the gauge wheel position will remain substantially unchanged when the row unit reengages the soil. As illustrated, the blocking valve 114 includes a first position 116 that facilitates air flow to the depth control cylinders 44 and 68, and a second position 118 that blocks the air flow. In the present embodiment, the blocking valve 114 is actuated by the parallel linkage 18 coupled to the tool bar 14. Consequently, when the tool bar 14 transitions to the non-working position, the blocking valve 114 is driven to the second position 118 which blocks air flow. Conversely, when the tool bar 14 is in the working position, the blocking valve 114 is driven to the first position 116 such that the pressure to the cylinders 44 and 68 may be regulated as described above.

In the illustrated embodiment, a down force control valve 120 is in fluid communication with the down force cylinder 20. The down force control valve 120 is configured to regulate a pressure within the down force cylinder 20, thereby adjusting the contact force between the gauge wheels and the soil. In the present embodiment, the down force control valve 120 is a three position/four way rotary leveling valve. The first position 122 is configured to block air flow to the down force cylinder 20, the second position 124 is configured to facilitate air flow into the down force cylinder 20, and the third position 126 is configured to facilitate air flow out of the down force cylinder 20. As illustrated, a pneumatic conduit 128 extends between the down force control valve 120 and the pneumatic supply conduit 78, and a pneumatic conduit 130 extends between the down force control valve 120 and the down force cylinder 20. Consequently, while the down force control valve 120 is in the second position 124, air may flow from the pneumatic source to the cap end of the down force cylinder 20 via the conduits 78, 128 and 130, and the valve 120.

As illustrated, the position of the down force control valve 120 is regulated by a down force control actuator 132. In the present configuration, the down force control actuator 132 is a double acting pneumatic cylinder having a pneumatic supply conduit 134 coupled to the rod end of the cylinder. In this configuration, the down force control valve 120 may be actuated by increasing or decreasing pressure to the rod end of the actuator 132. For example, in the present configuration, increasing pressure to the rod end drives the down force control valve 120 toward the second position 124, thereby providing air pressure to the down force cylinder 20. Conversely, decreasing pressure to the actuator 132 allows pressure within the cap end to urge the piston toward the rod end, thereby driving the down force control valve 120 to the third position 126 that releases air from the down force cylinder 20.

In the present configuration, the pressure within the pneumatic supply conduit 134 is controlled by a selection control valve 136. As illustrated, the selection control valve 136 is a two position/two way pneumatic valve. The first position 138 is configured to block air flow through the valve, while the second position 140 facilitates air flow to the down force control actuator 132. An electronic actuator 142 (e.g., solenoid) regulates the position of the selection control valve 136. The electronic actuator 142 is communicatively coupled to the ECU 96 which is configured to vary the position of the selection control valve 136 to achieve a desired pressure within the actuator 132. Consequently, the ECU 96 may automatically regulate the force applied by the down force cylinder 20. For example, an operator may input a desired down force into a user interface 144. The user interface 144 may then output a signal to the ECU 96 indicative of the desired down force such that the ECU 96 adjusts the pressure within the down force actuator 132 to achieve the desired force. In certain embodiments, the sensor assembly 97 may be configured to measure the down force applied by the down force cylinder 20. For example, the sensor assembly 97 may include a pressure sensor in fluid communication with the conduit 130 and configured to output a signal indicative of the force applied by the down force cylinder 20. In such embodiments, the ECU 96 may automatically regulate pressure within the actuator 132 to maintain the desired down force.

The selection control valve 136 is fluidly coupled to the inflate/exhaust valve 98 via the pneumatic supply conduit 100. As previously discussed, the inflate/exhaust valve 98 is a three position/four way valve. The first position 102 is configured to block air flow between the pneumatic supply conduit 100 and the pneumatic source, the second position 104 is configured to facilitate air flow out of the pneumatic supply conduit 100, and the third position 106 is configured to fluidly couple the pneumatic source to the pneumatic supply conduit 100. By adjusting the position of the inflate/exhaust valve 98, the ECU 96 may selectively provide air to the pneumatic supply conduit 100, maintain air pressure within the pneumatic supply conduit 100, or release air from the pneumatic supply conduit 100. In this configuration, the ECU 96 may provide a desired pressure to the selection control valve 136 by adjusting the position of the inflate/exhaust valve 98 via the actuators 108 and 110.

As previously discussed, the ECU 96 is configured to automatically regulate the force applied by the down force cylinder 20. For example, if the force is lower than desired, the ECU 96 will activate the solenoid 142, thereby driving the selection control valve 136 to the second position 140. The ECU 96 will then activate the solenoid 110, thereby driving the inflate/exhaust valve 98 to the second position 106. In the second position 106, air from the pneumatic source will flow into the pneumatic supply conduit 100. With the selection control valve 136 in the second position 140, air from the pneumatic supply conduit 100 will flow through the valve 136 and the pneumatic conduit 134 to the actuator 132 until a desired pressure within the actuator 132 is achieved, as measured by the pressure sensor 112. Next, the ECU 96 will instruct the electronic actuator 142 to transition the valve 136 to the first position 138, thereby blocking air flow between the supply conduit 100 and the actuator 132. Consequently, pressure within the rod end of the actuator 132 will be maintained at the desired pressure. As previously discussed, increasing air pressure to the rod end of the actuator 132 drives the down force control valve 120 toward the second position 124, thereby providing the down force cylinder 20 with air from the supply conduits 78 and 128. As a result, the force applied by the down force cylinder 20 will increase until the desired force is achieved.

Once the desired down force is reached, the ECU 96 will terminate air flow to the down force cylinder 20. Specifically, the ECU 96 will transition the selection control valve 136 to the second position 140 which establishes fluid communication between the conduits 134 and 100. The ECU 96 will then transition the inflate/exhaust valve 98 to the second position 104 which facilitates air flow out of the pneumatic supply conduit 100. Consequently, pressure within the rod end of the down force actuator 132 will decrease as air exhausts from the actuator 132. As previously discussed, the decrease in air pressure will drive the piston rod of the actuator 132 toward the rod end, thereby inducing the down force control valve 120 to transition to the first position 122 which blocks air flow to the down force cylinder 20. Once the ECU 96 receives a signal from the pressure sensor 112 that the pressure within the rod end of the actuator 132 corresponds to a pressure indicative of the down force control valve 120 being in the first position 122, the ECU 96 will transition the selection control valve 136 to the first position 138 which blocks flow to the pneumatic supply conduit 134. Consequently, pressure within the actuator 132 will be maintained, thereby blocking air flow to the down force cylinder 20. It should be appreciated that transitioning the selection control valve 136 to the second position 140 and transitioning the inflate/exhaust valve 98 to the first position 102 enables the pressure sensor 112 to measure the pressure within the rod end of the actuator 132.

As previously discussed, the down force actuator 132 is a double acting cylinder having fluid connections to both the rod end and the cap end. Consequently, in addition to controlling the actuator 132 by varying the air pressure within the rod end, as described above, the actuator 132 may be controlled by varying the air pressure within the cap end. In the illustrated embodiment, a pneumatic conduit 145 extends between the depth control conduit 80 and the cap end of the down force actuator 132. In this configuration, a valve assembly, including the actuator 132 and the down force control valve 120, facilitates automatic adjustment of the contact force between the gauge wheels and the soil by varying the pressure within the down force cylinder 20 based on air pressure within the depth control cylinders 44 and 68.

A desired penetration depth of the opener disks may be established by varying the position of the gauge wheels. Specifically, pressure within the cap end of the depth control cylinders 44 and 68 may be adjusted to achieve the desired gauge wheel position. However, with the row unit 16 in a steady state condition (e.g., not moving, moving along a substantially flat surface, etc.), the pressure within the cap end of the depth control cylinders 44 and 68 will remain substantially constant. Consequently, the pressure within the cap end of the down force actuator 132 will remain substantially constant due to the fluid connection between the cylinders 44 and 68 and the actuator 132. As a result, while the row unit 16 is in a steady state condition, the down force may be regulated as described above, i.e., by varying pressure to the rod end of the actuator 132. However, once the selection control valve 136 is in the first position 138 such that air flow to the rod end of the actuator 132 is blocked, any subsequent change to the pressure within the cap end of the actuator 132 will drive the down force control valve 120 toward the second position 124 or the third position 126.

Certain variations in the terrain may induce the gauge wheels to move upwardly relative to the opener disks. In such a situation, the ECU 96 or the linkage between the depth control valve 70 and the gauge wheel arm 40 may automatically increase pressure to the depth control cylinders 44 and 68 to compensate, thereby maintaining the desired opener disk penetration depth. However, increasing pressure to the cylinders 44 and 68 also increases the contact force between the gauge wheels and the soil. As previously discussed, excessive contact force may result in compacted soil which impedes the growth of seeds deposited within the soil. Consequently, the valve assembly may automatically reduce the force applied by the down force cylinder 20 in response to an increase in pressure within the cylinders 44 and 68. In this manner, the contact force between the gauge wheels and the soil may be maintained despite variations in the terrain.

For example, an increase in pressure within the cap end of the depth control cylinders 44 and 68 will increase pressure within the cap end of the down force actuator 132 via the fluid connection established by the pneumatic conduit 145. As will be appreciated, the pressure increase within the cap end of the actuator 132 will drive the down force control valve 120 toward the third position 126 that facilitates air flow from the down force cylinder 20. As a result, the force applied by the cylinder 20 will decrease, thereby resulting in a reduced contact force between the gauge wheels and the soil. As the contact force decreases, the pressure within the cap end of the depth control cylinders 44 and 68 will decrease. Consequently, the pressure within the cap end of the actuator 132 will be reduced, thereby transitioning the down force control valve 120 back to the first position 122 that blocks air flow to the down force cylinder 20. In this manner, the contact force between the gauge wheels and the soil may be automatically maintained despite an increase in pressure within the depth control cylinders 44 and 68.

Conversely, certain conditions may induce the gauge wheels to move downwardly relative to the opener disks. For example, as the quantity of seed and/or fertilizer within the row unit 16 decreases, the penetration depth of the opener disks into the soil will be reduced due to the decrease in row unit weight. To compensate, the depth control valve 70 may decrease pressure to the depth control cylinders 44 and 68, thereby raising the gauge wheels relative to the opener disks. However, decreasing pressure to the cylinders 44 and 68 also decreases the contact force between the gauge wheels and the soil. If the contact force is too low, the opener disks may rise out of the ground. Consequently, the valve assembly may automatically increase the force applied by the down force cylinder 20 in response to the decrease in pressure within the cylinders 44 and 68. In this manner, the contact force between the gauge wheels and the soil may be maintained despite variations in row unit weight.

For example, a decrease in pressure within the cap end of the depth control cylinders 44 and 68 will decrease pressure within the cap end of the down force actuator 132 via the fluid connection established by the pneumatic conduit 145. As will be appreciated, the pressure decrease within the cap end of the actuator 132 will drive the down force control valve 120 to the second position 124 that facilitates air flow into the cylinder 20 from the pneumatic conduit 128. As a result, the force applied by the cylinder 20 will increase, thereby resulting in an increased contact force between the gauge wheels and the soil. As the contact force increases, the pressure within the cap end of the depth control cylinders 44 and 68 will increase. Consequently, the pressure within the cap end of the actuator 132 will rise, thereby transitioning the down force control valve 120 back to the first position 122 that blocks air flow to the down force cylinder 20. In this manner, the contact force between the gauge wheels and the soil may be automatically maintained despite a decrease in pressure within the depth control cylinders 44 and 68.

As will be appreciated, the down force actuator 132 may be particularly configured to induce a desired degree of movement within the down force control valve 120 in response to variations in depth control cylinder pressure. For example, the length and/or width of the double acting cylinder may be configured to achieve a desired dynamic response (e.g., piston rod movement in response to pressure within the cap end). In addition, the actuator 132 may include valves and/or springs configured to bias the piston to the cap end or the rod end of the cylinder, thereby establishing a desired relationship between pressure and piston rod movement.

The illustrated row unit 16 also includes a blocking valve 146 configured to maintain pressure within the down force cylinder 20 while the implement 10 is in the non-working position. As previously discussed, the tool bar 14 may be raised above the ground at a headland of a field such that the row units 16 disengage the soil. In this non-working position, the implement 10 may be rotated at the headland and aligned with the next series of rows without the row units 16 excavating trenches or depositing seeds within the headland. Maintaining air pressure within the down force cylinder 20 while the implement 10 is in the non-working position ensures that the down force will remain substantially unchanged when the row unit reengages the soil. As illustrated, the blocking valve 146 includes a first position 148 that facilitates air flow to the down force cylinder 20, and a second position 150 that blocks the air flow. In the present embodiment, the blocking valve 146 is actuated by the parallel linkage 18 coupled to the tool bar 14. Consequently, when the tool bar 14 transitions to the non-working position, the blocking valve 146 is driven to the second position 150 which blocks air flow. Conversely, when the tool bar 14 is in the working position, the blocking valve 146 is driven to the first position 148 such that the pressure to the down force cylinder 20 may be regulated as described above.

In the illustrated embodiment, the row unit 16 also includes a pressure relief valve 152 in fluid communication with the pneumatic conduit 130. In this configuration, if the pressure within the cap end of the cylinder 20 exceeds a predetermined level, the pressure relief valve 152 will open, thereby reducing the pressure in the cylinder 20. For example, if the row unit 16 encounters a rock or other obstruction in the soil, the row unit 16 will be driven upwardly. As a result, air pressure within the cap end of the cylinder 20 will increase rapidly. In such a situation, the pressure relief valve 152 will open, thereby decreasing the pressure and substantially reducing or eliminating the possibility of excessive wear of pneumatic components. In alternative embodiments, the pneumatic components may be particularly configured to resist pressures associated with full upward displacement of the row unit 16. In such embodiments, the pressure relief valve 152 may be omitted.

The illustrated embodiment also includes a closing disk cylinder 50 configured to regulate a contact force between the closing disks and the soil. As illustrated, a pneumatic supply conduit 154 extends between a cap end of the cylinder 50 and a selection control valve 156. Similar to adjusting the pressure within the actuators 84 and 132, the ECU 96 is configured to regulate the pressure within the closing disk cylinder 50 by operating the selection control valve 156 and the intake/exhaust valve 98. For example, an operator may input a desired contact force into the user interface 144. The user interface 144 may then output a signal to the ECU 96 indicative of the desired contact force such that the ECU 96 adjusts the pressure within the closing disk cylinder 50 to achieve the desired force. In certain embodiments, the sensor assembly 97 may be configured to measure a degree of soil compaction. For example, the sensor assembly 97 may include a soil profile sensor or other device capable of quantifying soil compaction and outputting a signal indicative of soil compaction to the ECU 96. Alternatively, a course estimation of soil compaction may be determined by measuring the pressure within the down force cylinder 20. The ECU 96 may then compute the desired contact force based on the degree of compaction. For example, a large contact force may be applied to effectively push dense soil into the trench, while a relatively small contact force may be applied to close a trench within loose soil. In this manner, the ECU 96 may automatically adjust air pressure to the closing disk cylinder 50 based on the detected soil compaction.

In the present configuration, the pressure within the closing disk cylinder 50 is controlled by the selection control valve 156. As illustrated, the selection control valve 156 is a two position/two way pneumatic valve. The first position 158 is configured to block air flow through the valve, while the second position 160 facilitates air flow to the closing disk cylinder 50. An electronic actuator 162 (e.g., solenoid) regulates the position of the selection control valve 156. The electronic actuator 162 is communicatively coupled to the ECU 96 which is configured to vary the position of the selection control valve 156 to achieve a desired pressure within the cylinder 50. Consequently, the ECU 96 may automatically regulate the contact force applied by the closing disk cylinder 50.

The selection control valve 156 is fluidly coupled to the inflate/exhaust valve 98 via the pneumatic supply conduit 100. As previously discussed, the inflate/exhaust valve 98 is a three position/four way valve. The first position 102 is configured to block air flow between the pneumatic supply conduit 100 and the pneumatic source, the second position 104 is configured to facilitate air flow out of the pneumatic supply conduit 100, and the third position 106 is configured to fluidly couple the pneumatic source to the pneumatic supply conduit 100. By adjusting the position of the inflate/exhaust valve 98, the ECU 96 may selectively provide air to the pneumatic supply conduit 100, maintain air pressure within the pneumatic supply conduit 100, or release air from the pneumatic supply conduit 100. In this configuration, the ECU 96 may provide a desired pressure to the closing disk cylinder 50 by adjusting the position of the inflate/exhaust valve 98 via the actuators 108 and 110.

For example, to increase pressure to the cap end of the closing disk cylinder 50, the ECU 96 will activate the solenoid 162, thereby driving the selection control valve 156 to the second position 160. The ECU 96 will then activate the solenoid 110, thereby driving the inflate/exhaust valve 98 to the second position 106. In the second position 106, air from the pneumatic source will flow into the pneumatic supply conduit 100. With the selection control valve 156 in the second position 160, air from the pneumatic supply conduit 100 will flow through the valve 156 and the pneumatic conduit 154 to the closing disk cylinder 50 until a desired pressure within the cylinder 50 is achieved, as measured by the pressure sensor 112. Next, the ECU 96 will instruct the electronic actuator 162 to transition the valve 156 to the first position 158, thereby blocking air flow between the supply conduit 100 and the cylinder 50. Consequently, pressure within the cap end of the cylinder 50 will be maintained at the desired pressure.

Conversely, to decrease pressure within the cap end of the closing disk cylinder 50, the ECU 96 will transition the selection control valve 156 to the second position 160 which establishes fluid communication between the conduits 154 and 100. The ECU 96 will then transition the inflate/exhaust valve 98 to the second position 104 which facilitates air flow out of the pneumatic supply conduit 100. Consequently, pressure within the cap end of the closing disk cylinder 50 will decrease as air exhausts from the cylinder 50. Once the ECU 96 receives a signal from the pressure sensor 112 that the pressure within the cap end of the closing disk cylinder 50 has reached a desired level, the ECU 96 will transition the selection control valve 156 to the first position 158 which blocks flow to the pneumatic supply conduit 154. Consequently, pressure within the closing disk cylinder 50 will be maintained. In this manner, the ECU 96 may automatically regulate the contact force applied by the closing disk cylinder 50 in response to either operator input or detected soil compaction. It should be appreciated that transitioning the selection control valve 156 to the second position 160 and transitioning the inflate/exhaust valve 98 to the first position 102 enables the pressure sensor 112 to measure the pressure within the cap end of the closing disk cylinder 50.

In addition, the illustrated embodiment includes a press wheel cylinder 56 configured to regulate a contact force between the press wheel and the soil. As illustrated, a pneumatic supply conduit 166 extends between a cap end of the cylinder 56 and a selection control valve 168. Similar to adjusting the pressure within the closing disk cylinder 50, the ECU 96 is configured to regulate the pressure within the press wheel cylinder 56 by operating the selection control valve 168 and the intake/exhaust valve 98. For example, an operator may input a desired contact force into the user interface 144. The user interface 144 may then output a signal to the ECU 96 indicative of the desired contact force such that the ECU 96 adjusts the pressure within the press wheel cylinder 56 to achieve the desired force. In certain embodiments, the sensor assembly 97 may be configured to measure soil moisture content. For example, the sensor assembly 97 may include a soil density sensor or other device capable of quantifying soil moisture and outputting a signal indicative of soil moisture to the ECU 96. In such embodiments, the ECU 96 may compute the desired contact force based on the signal. For example, in dry conditions, it may be desirable to firmly pack soil directly over the seeds to seal in moisture. In damp conditions, it may be desirable to leave the soil over the seeds fairly loose in order to avoid compaction which may result in seed crusting. In this manner, the ECU 96 may automatically adjust air pressure to the press wheel cylinder 56 based on the detected soil moisture level.

In the present configuration, the pressure within the press wheel cylinder 56 is controlled by the selection control valve 168. As illustrated, the selection control valve 168 is a two position/two way pneumatic valve. The first position 170 is configured to block air flow through the valve, while the second position 172 facilitates air flow to the press wheel cylinder 56. An electronic actuator 174 (e.g., solenoid) regulates the position of the selection control valve 168. The electronic actuator 174 is communicatively coupled to the ECU 96 which is configured to vary the position of the selection control valve 168 to achieve a desired pressure within the cylinder 56. Consequently, the ECU 96 may automatically regulate the contact force applied by the press wheel cylinder 56.

The selection control valve 168 is fluidly coupled to the inflate/exhaust valve 98 via the pneumatic supply conduit 100. As previously discussed, the inflate/exhaust valve 98 is a three position/four way valve. The first position 102 is configured to block air flow between the pneumatic supply conduit 100 and the pneumatic source, the second position 104 is configured to facilitate air flow out of the pneumatic supply conduit 100, and the third position 106 is configured to fluidly couple the pneumatic source to the pneumatic supply conduit 100. By adjusting the position of the inflate/exhaust valve 98, the ECU 96 may selectively provide air to the pneumatic supply conduit 100, maintain air pressure within the pneumatic supply conduit 100, or release air from the pneumatic supply conduit 100. In this configuration, the ECU 96 may provide a desired pressure to the press wheel cylinder 56 by adjusting the position of the inflate/exhaust valve 98 via the actuators 108 and 110.

For example, to increase pressure to the cap end of the press wheel cylinder 56, the ECU 96 will activate the solenoid 174, thereby driving the selection control valve 168 to the second position 172. The ECU 96 will then activate the solenoid 110, thereby driving the inflate/exhaust valve 98 to the second position 106. In the second position 106, air from the pneumatic source will flow into the pneumatic supply conduit 100. With the selection control valve 168 in the second position 172, air from the pneumatic supply conduit 100 will flow through the valve 168 and the pneumatic conduit 166 to the press wheel cylinder 56 until a desired pressure within the cylinder 56 is achieved, as measured by the pressure sensor 112. Next, the ECU 96 will instruct the electronic actuator 174 to transition the valve 168 to the first position 170, thereby blocking air flow between the supply conduit 100 and the cylinder 56. Consequently, pressure within the cap end of the cylinder 56 will be maintained at the desired pressure.

Conversely, to decrease pressure within the cap end of the press wheel cylinder 56, the ECU 96 will transition the selection control valve 168 to the second position 172 which establishes fluid communication between the conduits 166 and 100. The ECU 96 will then transition the inflate/exhaust valve 98 to the second position 104 which facilitates air flow out of the pneumatic supply conduit 100. Consequently, pressure within the cap end of the press wheel cylinder 56 will decrease as air exhausts from the cylinder 56. Once the ECU 96 receives a signal from the pressure sensor 112 that the pressure within the cap end of the press wheel cylinder 56 has reached a desired level, the ECU 96 will transition the selection control valve 168 to the first position 170 which blocks flow to the pneumatic supply conduit 166. Consequently, pressure within the press wheel cylinder 56 will be maintained. In this manner, the ECU 96 may automatically regulate the contact force applied by the press wheel cylinder 56 in response to either operator input or detected soil moisture/density. It should be appreciated that transitioning the selection control valve 168 to the second position 172 and transitioning the inflate/exhaust valve 98 to the first position 102 enables the pressure sensor 112 to measure the pressure within the cap end of the press wheel cylinder 56.

The illustrated embodiment also includes a residue manager cylinder 64 configured to regulate a contact force between the residue manager and the soil. As illustrated, a pneumatic supply conduit 178 extends between a cap end of the cylinder 64 and a selection control valve 180. Similar to adjusting the pressure within the closing disk cylinder 50, the ECU 96 is configured to regulate the pressure within the residue manager cylinder 64 by operating the selection control valve 180 and the intake/exhaust valve 98. For example, an operator may input a desired contact force into the user interface 144. The user interface 144 may then output a signal to the ECU 96 indicative of the desired contact force such that the ECU 96 adjusts the pressure within the residue manager cylinder 64 to achieve the desired force. In certain embodiments, the sensor assembly 97 may be configured to measure a percentage of residue cover. For example, the sensor assembly 97 may include an optical sensor or other device capable of quantifying residue cover and outputting a signal indicative of residue coverage percentage to the ECU 96. In such embodiments, the ECU 96 may compute the desired contact force based on the signal. For example, if the residue cover is greater than the desired percentage, the ECU 96 may increase contact force. Conversely, if the residue cover is less than the desired percentage, the ECU 96 may decrease contact force. In this manner, the ECU 96 may automatically adjust air pressure to the residue manager cylinder 64 based on the detected residue coverage percentage.

In the present configuration, the pressure within the residue manager cylinder 64 is controlled by the selection control valve 180. As illustrated, the selection control valve 180 is a two position/two way pneumatic valve. The first position 182 is configured to block air flow through the valve, while the second position 184 facilitates air flow to the residue manager cylinder 64. An electronic actuator 186 (e.g., solenoid) regulates the position of the selection control valve 180. The electronic actuator 186 is communicatively coupled to the ECU 96 which is configured to vary the position of the selection control valve 180 to achieve a desired pressure within the cylinder 64. Consequently, the ECU 96 may automatically regulate the contact force applied by the residue manager cylinder 64.

The selection control valve 180 is fluidly coupled to the inflate/exhaust valve 98 via the pneumatic supply conduit 100. As previously discussed, the inflate/exhaust valve 98 is a three position/four way valve. The first position 102 is configured to block air flow between the pneumatic supply conduit 100 and the pneumatic source, the second position 104 is configured to facilitate air flow out of the pneumatic supply conduit 100, and the third position 106 is configured to fluidly couple the pneumatic source to the pneumatic supply conduit 100. By adjusting the position of the inflate/exhaust valve 98, the ECU 96 may selectively provide air to the pneumatic supply conduit 100, maintain air pressure within the pneumatic supply conduit 100, or release air from the pneumatic supply conduit 100. In this configuration, the ECU 96 may provide a desired pressure to the residue manager cylinder 64 by adjusting the position of the inflate/exhaust valve 98 via the actuators 108 and 110.

For example, to increase pressure to the cap end of the residue manager cylinder 64, the ECU 96 will activate the solenoid 186, thereby driving the selection control valve 180 to the second position 184. The ECU 96 will then activate the solenoid 110, thereby driving the inflate/exhaust valve 98 to the second position 106. In the second position 106, air from the pneumatic source will flow into the pneumatic supply conduit 100. With the selection control valve 180 in the second position 184, air from the pneumatic supply conduit 100 will flow through the valve 180 and the pneumatic conduit 178 to the residue manager cylinder 64 until a desired pressure within the cylinder 64 is achieved, as measured by the pressure sensor 112. Next, the ECU 96 will instruct the electronic actuator 186 to transition the valve 180 to the first position 182, thereby blocking air flow between the supply conduit 100 and the cylinder 64. Consequently, pressure within the cap end of the cylinder 64 will be maintained at the desired pressure.

Conversely, to decrease pressure within the cap end of the residue manager cylinder 64, the ECU 96 will transition the selection control valve 180 to the second position 184, which establishes fluid communication between the conduits 178 and 100. The ECU 96 will then transition the inflate/exhaust valve 98 to the second position 104, which facilitates air flow out of the pneumatic supply conduit 100. Consequently, pressure within the cap end of the residue manager cylinder 64 will decrease as air exhausts from the cylinder 64. Once the ECU 96 receives a signal from the pressure sensor 112 that the pressure within the cap end of the residue manager cylinder 64 has reached a desired level, the ECU 96 will transition the selection control valve 180 to the first position 182 which blocks flow to the pneumatic supply conduit 178. Consequently, pressure within the residue manager cylinder 64 will be maintained. In this manner, the ECU 96 may automatically regulate the contact force applied by the residue manager cylinder 64 in response to either operator input or detected residue cover. It should be appreciated that transitioning the selection control valve 180 to the second position 184 and transitioning the inflate/exhaust valve 98 to the first position 102 enables the pressure sensor 112 to measure the pressure within the cap end of the residue manager cylinder 64.

In the illustrated embodiment, the implement 10 includes a manual backup system 188 configured to facilitate manual control of the pneumatic cylinders 20, 44, 50, 56, 64 and 68 in the event of an electrical failure. While the backup system 188 is described as "manual," it should be appreciated that pressure regulation within the down force cylinder 20 and the depth control cylinders 44 and 68 will remain automatic, as described above. In the present embodiment, the manual backup system 188 enables an operator to adjust the pressure to each cylinder via a series of pressure regulators. As illustrated, the manual backup system 188 includes a mode select valve 190 configured to automatically activate the backup system 188 during an electrical failure. In the present embodiment, the mode select valve 190 is a two position/three way pneumatic valve. The first position 192 is configured to enable air to flow out of a pilot conduit 194, while the second position 196 facilitates air flow into the pilot conduit 194 from the pneumatic source. An electronic actuator 198 (e.g., solenoid) regulates the position of the mode select valve 190. While electrical power is supplied to the actuator 198, the actuator 198 holds the valve 190 in the second position 196 such that air is provided to the pilot conduit 194. In the event of an electrical failure, the mode select valve 190 will transition to the first position 192 such that the air exhausts from the pilot conduit 194.

Also in the illustrated embodiment, the pilot conduit 194 is in fluid communication with a series of actuators configured to control operation of a corresponding series of selection control valves. If the pilot conduit 194 is pressurized with the air flow from the pneumatic source, the selection control valves will remain closed, thereby disabling the manual backup system 188. However, in the event of an electrical failure, the mode select valve 190 will facilitate air flow out of the pilot conduit 194, thereby inducing the selection control valves to activate the manual backup system 188. Furthermore, an electrical failure will induce the selection control valves 88, 136, 156, 168 and 180 to transition to their respective first positions, thereby disabling automatic control of the cylinders 20, 44, 50, 56, 64 and 68.

Each selection control valve 88, 136, 156, 168 and 180 configured to facilitate automatic control of the cylinders 20, 44, 50, 56, 64 and 68 has a corresponding selection control valve associated with the manual backup system 188. For example, a first selection control valve 200 is in fluid communication with the pneumatic conduit 86 attached to the selection control valve 88 which regulates operation of the depth control cylinders 44 and 68. The first selection control valve 200 includes a first position 202 configured to facilitate air flow through the valve, and a second position 204 configured to block air flow. A pneumatic actuator 206 coupled to the valve 200 varies the position of the first selection control valve 200 based on air pressure within the pilot conduit 194. Specifically, the actuator 206 is configured to transition the first selection control valve 200 to the first position 202 if air pressure is exhausted from the pilot conduit 194. In this configuration, an electrical failure will induce the selection control valve 88 to transition to the first position 90 which blocks the flow of air, and will induce the first selection control valve 200 to transition to the first position 202 which facilitates air flow through the valve. Consequently, an electrical failure will disable automatic control of the depth control cylinders 44 and 68, while enabling manual control.

Similarly, a second selection control valve 208 is in fluid communication with the pneumatic conduit 134 attached to the selection control valve 136 which regulates operation of the down force cylinder 20. The second selection control valve 208 includes a first position 210 configured to facilitate air flow through the valve, and a second position 212 configured to block air flow. A pneumatic actuator 214 coupled to the valve 208 varies the position of the second selection control valve 208 based on air pressure within the pilot conduit 194. Specifically, the actuator 214 is configured to transition the second selection control valve 208 to the first position 210 if air pressure is exhausted from the pilot conduit 194. In this configuration, an electrical failure will induce the selection control valve 136 to transition to the first position 138 which blocks the flow of air, and will induce the second selection control valve 208 to transition to the first position 210 which facilitates air flow through the valve. Consequently, an electrical failure will disable automatic control of the down force cylinder 20, while enabling manual control.

In addition, a third selection control valve 216 is in fluid communication with the pneumatic conduit 154 attached to the selection control valve 156 which regulates operation of the closing disk cylinder 50. The third selection control valve 216 includes a first position 218 configured to facilitate air flow through the valve, and a second position 220 configured to block air flow. A pneumatic actuator 222 coupled to the valve 216 varies the position of the third selection control valve 216 based on air pressure within the pilot conduit 194. Specifically, the actuator 222 is configured to transition the third selection control valve 216 to the first position 218 if air pressure is exhausted from the pilot conduit 194. In this configuration, an electrical failure will induce the selection control valve 156 to transition to the first position 158 which blocks the flow of air, and will induce the third selection control valve 216 to transition to the first position 218 which facilitates air flow through the valve. Consequently, an electrical failure will disable automatic control of the closing disk cylinder 50, while enabling manual control.

Furthermore, a fourth selection control valve 224 is in fluid communication with the pneumatic conduit 166 attached to the selection control valve 168 which regulates operation of the press wheel cylinder 56. The fourth selection control valve 224 includes a first position 226 configured to facilitate air flow through the valve, and a second position 228 configured to block air flow. A pneumatic actuator 230 coupled to the valve 224 varies the position of the fourth selection control valve 224 based on air pressure within the pilot conduit 194. Specifically, the actuator 230 is configured to transition the fourth selection control valve 224 to the first position 226 if air pressure is exhausted from the pilot conduit 194. In this configuration, an electrical failure will induce the selection control valve 168 to transition to the first position 170 which blocks the flow of air, and will induce the fourth selection control valve 224 to transition to the first position 226 which facilitates air flow through the valve. Consequently, an electrical failure will disable automatic control of the press wheel cylinder 56, while enabling manual control.

In addition, a fifth selection control valve 232 is in fluid communication with the pneumatic conduit 178 attached to the selection control valve 180 which regulates operation of the residue manager cylinder 64. The fifth selection control valve 232 includes a first position 234 configured to facilitate air flow through the valve, and a second position 236 configured to block air flow. A pneumatic actuator 238 coupled to the valve 232 varies the position of the fifth selection control valve 232 based on air pressure within the pilot conduit 194. Specifically, the actuator 238 is configured to transition the fifth selection control valve 232 to the first position 234 if air pressure is exhausted from the pilot conduit 194. In this configuration, an electrical failure will induce the selection control valve 180 to transition to the first position 182 which blocks the flow of air, and will induce the fifth selection control valve 232 to transition to the first position 234 which facilitates air flow through the valve. Consequently, an electrical failure will disable automatic control of the residue manager cylinder 64, while enabling manual control.

With each selection control valve 200, 208, 216, 224 and 232 in the first position, a flow path is established between the pneumatic conduits 86, 134, 154, 166 and 178 and respective pressure regulators. By adjusting air flow through each pressure regulator, pressure within the cylinders 50, 56, 64, 84 and 132 may be manually controlled. As illustrated, a first pressure regulator 240 is fluidly coupled to the first selection control valve 200, and configured to receive an air flow from the pneumatic source. Consequently, when the first selection control valve 200 is in the first position 202, the first pressure regulator 240 may vary the flow of air from the pneumatic source to the conduit 86, thereby adjusting the pressure within the depth control cylinders 44 and 68 via operation of the actuator 84. In the present embodiment, a first pressure gauge 242 is coupled to the conduit 86 downstream from the first selection control valve 200. In this configuration, an operator may vary the pressure within the conduit 86 by adjusting the first pressure regulator 240 until a desired pressure is shown on the first pressure gauge 242.

In addition, a second pressure regulator 244 is fluidly coupled to the second selection control valve 208, and configured to receive an air flow from the pneumatic source. Consequently, when the second selection control valve 208 is in the first position 210, the second pressure regulator 244 may vary the flow of air from the pneumatic source to the conduit 134, thereby adjusting the pressure within the down force cylinder 20 via operation of the actuator 132. In the present embodiment, a second pressure gauge 246 is coupled to the conduit 134 downstream from the second selection control valve 208. In this configuration, an operator may vary the pressure within the conduit 134 by adjusting the second pressure regulator 244 until a desired pressure is shown on the second pressure gauge 246.

Furthermore, a third pressure regulator 248 is fluidly coupled to the third selection control valve 216, and configured to receive an air flow from the pneumatic source. Consequently, when the third selection control valve 216 is in the first position 218, the third pressure regulator 248 may vary the flow of air from the pneumatic source to the conduit 154, thereby adjusting the pressure within the closing disk cylinder 50. In the present embodiment, a third pressure gauge 250 is coupled to the conduit 154 downstream from the third selection control valve 216. In this configuration, an operator may vary the pressure within the conduit 154 by adjusting the third pressure regulator 248 until a desired pressure is shown on the third pressure gauge 250.

The manual backup system 188 also includes a fourth pressure regulator 252 fluidly coupled to the fourth selection control valve 224, and configured to receive an air flow from the pneumatic source. Consequently, when the fourth selection control valve 224 is in the first position 226, the fourth pressure regulator 252 may vary the flow of air from the pneumatic source to the conduit 166, thereby adjusting the pressure within the press wheel cylinder 56. In the present embodiment, a fourth pressure gauge 254 is coupled to the conduit 166 downstream from the fourth selection control valve 224. In this configuration, an operator may vary the pressure within the conduit 166 by adjusting the fourth pressure regulator 252 until a desired pressure is shown on the fourth pressure gauge 254.

In addition, a fifth pressure regulator 256 is fluidly coupled to the fifth selection control valve 232, and configured to receive an air flow from the pneumatic source. Consequently, when the fifth selection control valve 232 is in the first position 234, the fifth pressure regulator 256 may vary the flow of air from the pneumatic source to the conduit 178, thereby adjusting the pressure within the residue manager cylinder 64. In the present embodiment, a fifth pressure gauge 258 is coupled to the conduit 178 downstream from the fifth selection control valve 232. In this configuration, an operator may vary the pressure within the conduit 178 by adjusting the fifth pressure regulator 256 until a desired pressure is shown on the fifth pressure gauge 258. Because the pressure within each cylinder 20, 44, 50, 56, 64 and 68 may be adjusted by the pressure regulators 240, 244, 248, 252 and 256, the backup system 188 may facilitate manual control of the row unit 16 in the event of an electrical failure.

Figure 4:
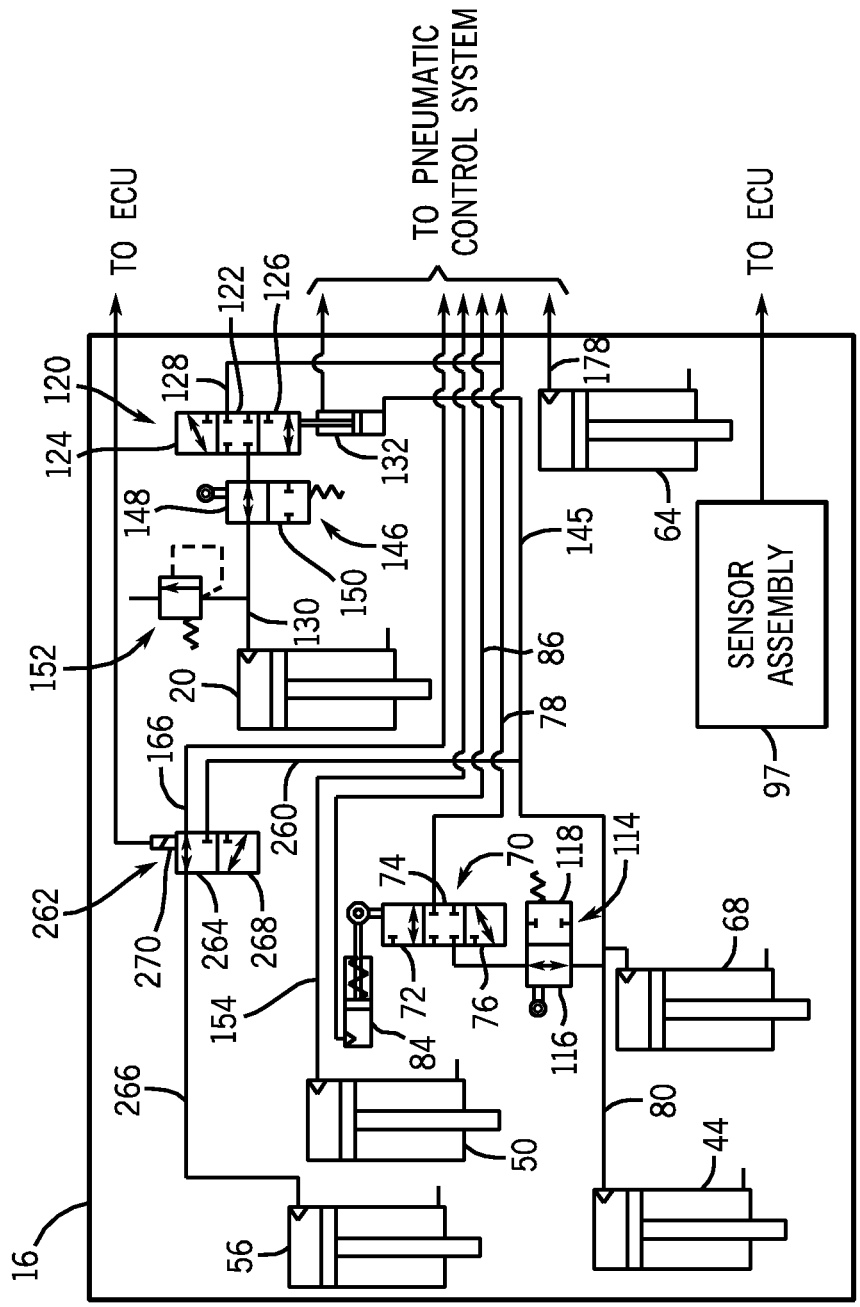
FIG. 4 is a schematic diagram of an alternative pneumatic system configured to automatically equalize a contact force of a press wheel and a gauge wheel.

FIG. 4 is a schematic diagram of an alternative pneumatic system configured to automatically equalize a contact force of a press wheel and a gauge wheel. In the illustrated embodiment, a pneumatic conduit 260 extends between the conduit 145 and a tandem press wheel valve 262. As illustrated, the tandem press wheel valve 262 is a two position/three way pneumatic valve. The first position 264 is configured to facilitate air flow from the pneumatic conduit 166 to a conduit 266 in fluid communication with the cap end of the press wheel cylinder 56, while blocking air flow from the conduit 260. The second position 268 blocks air flow from the conduit 166 to the conduit 266, while establishing a fluid connection between the conduit 260 and the conduit 266. An electronic actuator 270 (e.g., solenoid) regulates the position of the tandem press wheel valve 262. The electronic actuator 270 is communicatively coupled to the ECU 96 which is configured to vary the position of the tandem press wheel valve 262 in response to operator input (e.g., through the user interface 144).

While the tandem press wheel valve 262 is in the illustrated first position 264, air may flow from the selection control valve 168 to the press wheel cylinder 56 via the conduits 166 and 266. In this configuration, the ECU 96 may regulate the pressure within the cylinder 56 via operation of the selection control valve 168 and the inflate/exhaust valve 98. However, to equalize a contact force of the press wheel and the gauge wheels, the operator may input a command into the user interface 144 instructing the ECU 96 to transition the tandem press wheel valve 262 to the second position 268. As previously discussed, the second position 268 blocks air flow from the conduit 166, while facilitating air flow from the conduit 260. As a result, the ECU 96 will not be able to regulate pressure within the press wheel cylinder 56. Instead, pressure will be adjusted based on pressure within the depth control cylinders 44 and 68.

With the tandem press wheel valve 262 in the second position 268, a fluid connection is established between the depth control cylinders 44 and 68 and the press wheel cylinder 56. Specifically, air may flow from the cylinders 44 and 68 through the conduits 80, 145, 260 and 266 to the press wheel cylinder 56. In this manner, the contact force between the gauge wheels and the ground may be balanced with the contact force between the press wheel and the ground. For example, certain variations in the terrain may induce the gauge wheels to move upwardly relative to the opener disks. In such a situation, pressure will increase within the cap end of the depth control cylinders 44 and 68. The increased pressure will establish an air flow from the cylinders 44 and 68 to the press wheel cylinder 56, thereby driving the press wheel downwardly. The downward motion of the press wheel will drive the row unit 16 upwardly, thereby decreasing the contact force between the gauge wheels and the soil. As a result, the pressure within the cap end of the depth control cylinders 44 and 68 will decrease, thereby restoring the pressure between cylinders to equilibrium. Consequently, the contact force of the gauge wheels and the press wheel will be equalized, which may substantially reduce row unit vibration in response to contact with obstructions in the soil.

Conversely, certain variations in the terrain may induce the press wheel to move upwardly relative to the row unit chassis. In such a situation, pressure will increase within the cap end of the press wheel cylinder 56. The increased pressure will establish an air flow from the cylinder 56 to the depth control cylinders 44 and 68, thereby driving the gauge wheels downwardly. The downward motion of the gauge wheels will drive the row unit 16 upwardly, thereby decreasing the contact force between the press wheel and the soil. As a result, the pressure within the cap end of the press wheel cylinder 56 will decrease, thereby restoring the pressure between cylinders to equilibrium. Consequently, the contact force of the gauge wheels and the press wheel will be equalized, which may substantially reduce row unit vibration in response to contact with obstructions in the soil.

Figure 5:
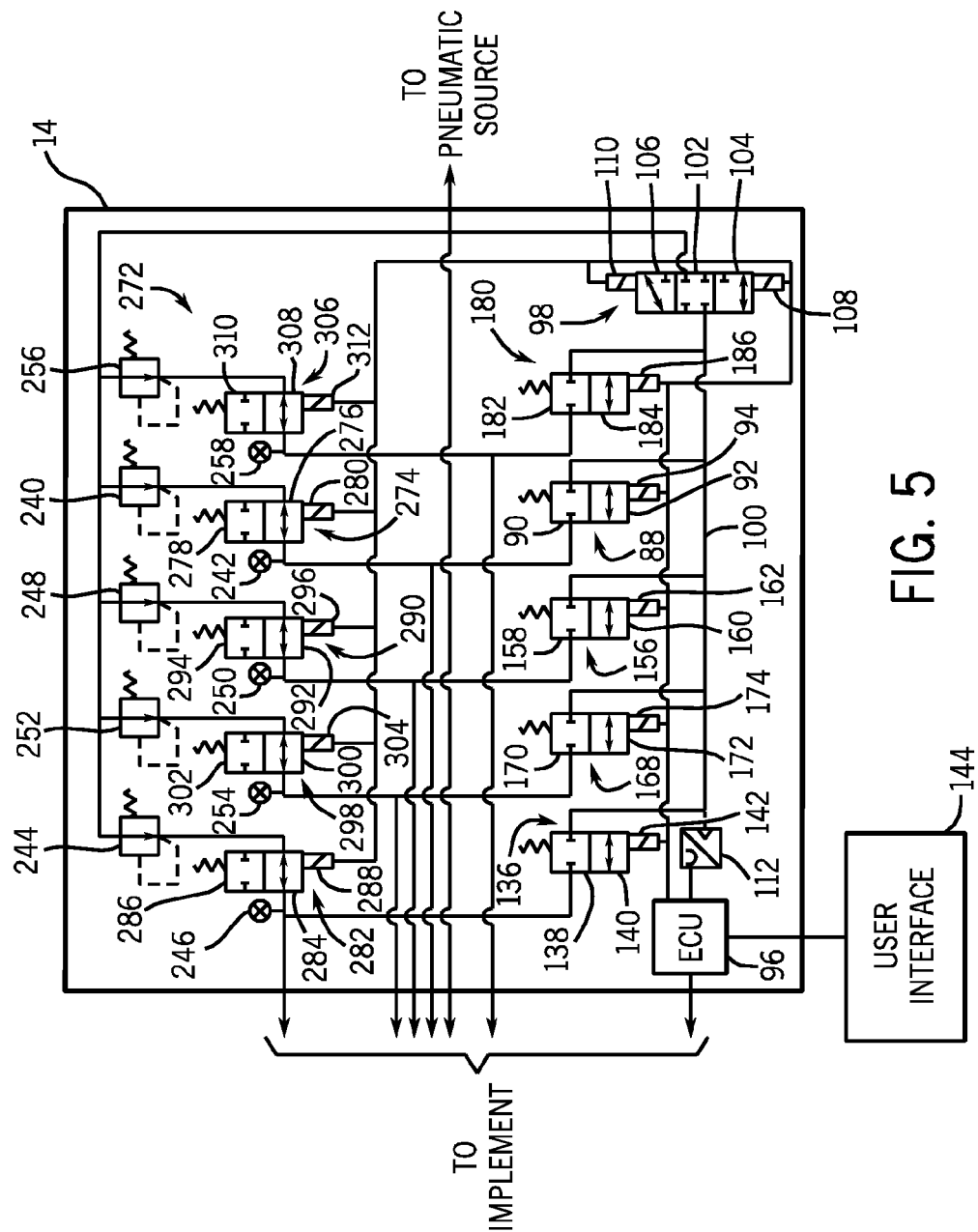
FIG. 5 is a schematic diagram of an alternative manual backup system configured to facilitate manual control of the pneumatic system.

FIG. 5 is a schematic diagram of an alternative manual backup system 272 configured to facilitate manual control of the pneumatic system. Specifically, the illustrated manual backup system 272 enables an operator to control the pneumatic cylinders 20, 44, 50, 56, 64 and 68 in the event of an electrical failure via a series of pressure regulators. As illustrated, the manual backup system 272 includes a series of selection control valves having electronic actuators configured to transition the valves to an open position in the event of an electrical failure. In this manner, the manual backup system 272 may be activated without the use of the mode selection valve 190 and pilot system described above. Similar to the embodiment described with reference to FIG. 3, an electrical failure will also induce the selection control valves 88, 136, 156, 168 and 180 to transition to their respective first positions, thereby disabling automatic control of the cylinders 20, 44, 50, 56, 64 and 68.

In the illustrated embodiment, each selection control valve 88, 136, 156, 168 and 180 has a corresponding selection control valve associated with the manual backup system 272. For example, a first selection control valve 274 is in fluid communication with the pneumatic conduit 86 attached to the selection control valve 88, which regulates operation of the depth control cylinders 44 and 68. The first selection control valve 274 includes a first position 276 configured to facilitate air flow through the valve, and a second position 278 configured to block air flow. An electronic actuator (e.g., solenoid) 280 coupled to the valve 274 varies the position of the first selection control valve 274 based on application of electrical power. Specifically, while electrical power is supplied to the actuator 280, the actuator 280 holds the valve 274 in the second position 278 which blocks air flow through the valve 274. In the event of an electrical failure, the selection control valve 88 will transition to the first position 90 which blocks the flow of air, and the first selection control valve 274 will transition to the first position 276, which facilitates air flow through the valve. Consequently, an electrical failure will disable automatic control of the depth control cylinders 44 and 68, while enabling manual control.

Similarly, a second selection control valve 282 is in fluid communication with the pneumatic conduit 134 attached to the selection control valve 136 which regulates operation of the down force cylinder 20. The second selection control valve 282 includes a first position 284 configured to facilitate air flow through the valve, and a second position 286 configured to block air flow. An electronic actuator (e.g., solenoid) 288 coupled to the valve 282 varies the position of the second selection control valve 282 based on application of electrical power. Specifically, while electrical power is supplied to the actuator 288, the actuator 288 holds the valve 282 in the second position 286 which blocks air flow through the valve 282. In the event of an electrical failure, the selection control valve 136 will transition to the first position 138 which blocks the flow of air, and the second selection control valve 282 will transition to the first position 284, which facilitates air flow through the valve. Consequently, an electrical failure will disable automatic control of the down force cylinder 20, while enabling manual control.

In addition, a third selection control valve 290 is in fluid communication with the pneumatic conduit 154 attached to the selection control valve 156 which regulates operation of the closing disk cylinder 50. The third selection control valve 290 includes a first position 292 configured to facilitate air flow through the valve, and a second position 294 configured to block air flow. An electronic actuator (e.g., solenoid) 296 coupled to the valve 290 varies the position of the third selection control valve 290 based on application of electrical power. Specifically, while electrical power is supplied to the actuator 296, the actuator 296 holds the valve 290 in the second position 294 which blocks air flow through the valve 290. In the event of an electrical failure, the selection control valve 156 will transition to the first position 158 which blocks the flow of air, and the third selection control valve 290 will transition to the first position 292, which facilitates air flow through the valve. Consequently, an electrical failure will disable automatic control of the closing disk cylinder 50, while enabling manual control.

Furthermore, a fourth selection control valve 298 is in fluid communication with the pneumatic conduit 166 attached to the selection control valve 168 which regulates operation of the press wheel cylinder 56. The fourth selection control valve 298 includes a first position 300 configured to facilitate air flow through the valve, and a second position 302 configured to block air flow. An electronic actuator (e.g., solenoid) 304 coupled to the valve 298 varies the position of the fourth selection control valve 298 based on application of electrical power. Specifically, while electrical power is supplied to the actuator 304, the actuator 304 holds the valve 298 in the second position 302 which blocks air flow through the valve 298. In the event of an electrical failure, the selection control valve 168 will transition to the first position 170 which blocks the flow of air, and the fourth selection control valve 298 will transition to the first position 300, which facilitates air flow through the valve. Consequently, an electrical failure will disable automatic control of the press wheel cylinder 56, while enabling manual control.

In addition, a fifth selection control valve 306 is in fluid communication with the pneumatic conduit 178 attached to the selection control valve 180 which regulates operation of the residue manager cylinder 64. The fifth selection control valve 306 includes a first position 308 configured to facilitate air flow through the valve, and a second position 310 configured to block air flow. An electronic actuator (e.g., solenoid) 312 coupled to the valve 306 varies the position of the fifth selection control valve 306 based on application of electrical power. Specifically, while electrical power is supplied to the actuator 312, the actuator 312 holds the valve 306 in the second position 310 which blocks air flow through the valve 306. In the event of an electrical failure, the selection control valve 180 will transition to the first position 182 which blocks the flow of air, and the fifth selection control valve 306 will transition to the first position 308, which facilitates air flow through the valve. Consequently, an electrical failure will disable automatic control of the residue manager cylinder 64, while enabling manual control.

Similar to the manual backup system 188 described above with reference to FIG. 3, positioning each of the selection control valves 274, 282, 290, 298 and 306 in their respective first position establishes a flow path between the pneumatic conduits 86, 134, 154, 166 and 178 and respective pressure regulators 240, 244, 248, 252 and 256. By adjusting air flow through each pressure regulator, pressure within the cylinders 20, 44, 50, 56, 64 and 68 may be manually controlled. In the present embodiment, a pressure gauge 242, 246, 250, 254 or 258 is coupled to a respective conduit 86, 134, 154, 166 or 178 downstream from the selection control valve. In this configuration, an operator may vary the pressure within the conduit by adjusting the pressure regulator until a desired pressure is shown on the pressure gauge. Because the pressure within each cylinder 20, 44, 50, 56, 64 and 68 may be adjusted by the pressure regulators 240, 244, 248, 252 and 256, the backup system 272 may facilitate manual control of the row unit 16 in the event of an electrical failure.

While the system described above employs pneumatic valves, cylinders and conduits, it should be appreciated that alternative embodiments may operate by transferring other working fluids throughout the system. For example, in certain embodiments, the implement 10 and row unit 16 may employ hydraulic valves, cylinders and conduits to establish a desired force and/or position of the ground engaging tools. In addition, while the system described above employs valves to control pressure within the cylinders, it should be appreciated that alternative embodiments may utilize electrically controlled pressure regulators or other pressure control devices. Furthermore, it should be appreciated that any suitable protocol may be employed to convey signals between the electronic actuators and the ECU 96. For example, certain embodiments may employ a CAN bus to relay control signals between the tractor and the row unit 16 or implement 10.

In addition, while the row unit 16 described above includes a down force cylinder 20, depth control cylinders 44 and 68, a closing disk cylinder 50, a press wheel cylinder 56, and a residue manager cylinder 64, it should be appreciated that alternative embodiments may include fewer cylinders for controlling the down force and/or position of the ground engaging tools. For example, in certain embodiments, the residue manager assembly 36, the soil closing assembly 32 and/or the press assembly 34 may omit the actuating cylinders such that the assemblies are manually adjustable. Furthermore, while a single row unit 16 is shown coupled to the pneumatic control system of the implement 10, it should be appreciated that the pneumatic control system may be employed to regulate pressure within cylinders of multiple row units 16. For example, in certain embodiments, a single pneumatic control system may control each row unit 16 of the implement 10. Alternatively, multiple pneumatic control systems may be utilized to individually control a respective row unit 16 or a group of row units 16.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement system, comprising:
a row unit;
a down force cylinder configured to apply a downward force to the row unit;
a depth control cylinder configured to vary a penetration depth of a ground engaging tool of the row unit;
a down force control valve in fluid communication with the down force cylinder, wherein the down force control valve is configured to regulate a flow of fluid to the down force cylinder to adjust the downward force; and
a down force control cylinder coupled to the down force control valve and in fluid communication with the depth control cylinder, wherein the down force control cylinder is configured to vary fluid pressure within the down force cylinder by adjusting the flow of fluid through the down force control valve based on fluid pressure within the depth control cylinder.

2. The agricultural implement system of claim 1, comprising a depth adjustment system configured to automatically maintain the penetration depth of the ground engaging tool by varying the fluid pressure within the depth control cylinder.

3. The agricultural implement system of claim 1, wherein the ground engaging tool comprises an opener disk rotatably coupled to a chassis of the row unit.

4. The agricultural implement system of claim 3, comprising a gauge wheel assembly movably coupled to the chassis and comprising a gauge wheel configured to rotate across a soil surface to limit the penetration depth of the opener disk into the soil, wherein the depth control cylinder extends between the chassis and the gauge wheel assembly, and the depth control cylinder is configured to vary the penetration depth of the opener disk by adjusting a position of the gauge wheel relative to the chassis.

5. The agricultural implement system of claim 1, comprising:
a press wheel assembly movably coupled to a chassis of the row unit and comprising a press wheel configured to rotate across a soil surface to pack soil over deposited seeds; and
a press wheel cylinder extending between the chassis and the press wheel assembly, wherein the press wheel cylinder is configured to vary a contact force between the press wheel and the soil surface.

6. The agricultural implement system of claim 5, wherein the press wheel cylinder is fluidly coupled to the depth control cylinder to facilitate fluid flow between the press wheel cylinder and the depth control cylinder.

7. The agricultural implement system of claim 6, comprising a tandem press wheel valve configured to selectively block fluid flow between the press wheel cylinder and the depth control cylinder.

8. The agricultural implement system of claim 1, wherein the row unit is movably coupled to a tool bar of an agricultural implement.

9. An agricultural implement system, comprising:
a row unit movably coupled to a tool bar of an agricultural implement;
an opener disk rotatably coupled to a chassis of the row unit and configured to engage soil;
a gauge wheel assembly movably coupled to the chassis and comprising a gauge wheel configured to rotate across a soil surface to limit a penetration depth of the opener disk into the soil;
a depth control cylinder extending between the chassis and the gauge wheel assembly, wherein the depth control cylinder is configured to adjust the penetration depth of the opener disk by varying a position of the gauge wheel relative to the chassis;
a down force cylinder extending between the tool bar and the chassis, wherein the down force cylinder is configured to vary a contact force between the gauge wheel and the soil surface;
a down force control valve in fluid communication with the down force cylinder and configured to regulate a flow of fluid to the down force cylinder to adjust the contact force; and
a down force control cylinder coupled to the down force control valve and in fluid communication with the depth control cylinder, wherein the down force control cylinder is configured to vary fluid pressure within the down force cylinder to adjust the contact force by adjusting the flow of fluid through the down force control valve based on fluid pressure within the depth control cylinder.

10. The agricultural implement system of claim 9, comprising a depth adjustment system configured to automatically maintain the penetration depth of the opener disk by varying the fluid pressure within the depth control cylinder.

11. The agricultural implement system of claim 9, comprising:
a closing disk assembly movably coupled to the chassis and comprising a closing disk configured to rotate across the soil surface to close a trench formed by the opener disk; and
a closing disk cylinder extending between the chassis and the closing disk assembly, wherein the closing disk cylinder is configured to vary a second contact force between the closing disk and the soil surface.

12. The agricultural implement system of claim 9, comprising:
a press wheel assembly movably coupled to the chassis and comprising a press wheel configured to rotate across the soil surface to pack soil over deposited seeds; and
a press wheel cylinder extending between the chassis and the press wheel assembly, wherein the press wheel cylinder is configured to vary a third contact force between the press wheel and the soil surface.

13. The agricultural implement system of claim 12, wherein the press wheel cylinder is fluidly coupled to the depth control cylinder to facilitate fluid flow between the press wheel cylinder and the depth control cylinder.

14. The agricultural implement system of claim 13, comprising a tandem press wheel valve configured to selectively block fluid flow between the press wheel cylinder and the depth control cylinder.

15. An agricultural implement system, comprising:
a row unit;
a down force cylinder configured to apply a downward force to the row unit;
a depth control cylinder configured to vary a penetration depth of a ground engaging tool of the row unit;
a down force control valve in fluid communication with the down force cylinder, wherein the down force control valve is configured to regulate a flow of fluid to the down force cylinder to adjust the downward force;

a down force control cylinder coupled to the down force control valve and in fluid communication with the depth control cylinder, wherein the down force control cylinder is configured to vary fluid pressure within the down force cylinder by adjusting the flow of fluid through the down force control valve based on fluid pressure within the depth control cylinder; and a blocking valve disposed between the down force cylinder and the down force control valve, wherein the blocking valve is configured to block fluid flow from the down force cylinder while the row unit is in a non-working position.

16. The agricultural implement system of claim 15, comprising:

a press wheel assembly movably coupled to a chassis of the row unit and comprising a press wheel configured to rotate across a soil surface to pack soil over deposited seeds; and a press wheel cylinder extending between the chassis and the press wheel assembly, wherein the press wheel cylinder is configured to vary a contact force between the press wheel and the soil surface.

17. The agricultural implement system of claim 16, wherein the press wheel cylinder is fluidly coupled to the depth control cylinder to facilitate fluid flow between the press wheel cylinder and the depth control cylinder.

18. The agricultural implement system of claim 17, comprising a tandem press wheel valve configured to selectively block fluid flow between the press wheel cylinder and the depth control cylinder.

19. The agricultural implement system of claim 15, comprising a depth adjustment system configured to automatically maintain the penetration depth of the ground engaging tool by varying the fluid pressure within the depth control cylinder.

20. The agricultural implement system of claim 15, wherein the row unit is movably coupled to a tool bar of an agricultural implement.

* * * * *